United States Patent [19]

Kishi et al.

[11] 4,034,192
[45] July 5, 1977

[54] NUMERICAL CONTROL SYSTEM HAVING A SYMMETRICAL PATH GENERATION MEANS

[75] Inventors: Hajimu Kishi; Fumio Onoda, both of Tokyo, Japan

[73] Assignee: Oki Electric Industry Company, Ltd., Tokyo, Japan

[22] Filed: Dec. 5, 1975

[21] Appl. No.: 637,971

[30] Foreign Application Priority Data

Dec. 13, 1974 Japan .............................. 49-142472

[52] U.S. Cl. .......................... 235/151.11; 318/567
[51] Int. Cl.² ...................................... G05B 19/24
[58] Field of Search ............... 235/151.11; 318/567

[56] References Cited

UNITED STATES PATENTS 3,416,056  12/1968  Motooka et al. ......... 235/151.11 X

*Primary Examiner*—Eugene G. Botz
*Attorney, Agent, or Firm*—Kenyon & Kenyon et al

[57] ABSTRACT

A numerical control comprising an input means for reading a program, a forward-interpolating-information producing circuit, a reverse-interpolating-information producing circuit, an interpolation circuit and a control circuit for controlling the above means is provided.

3 Claims, 8 Drawing Figures

| N001 | G01 | X2000 |  |  |  | F300 |
|---|---|---|---|---|---|---|
| N002 |  | X2000 | Y2000 |  |  |  |
| N003 |  | X2000 |  |  |  | F300 |
| N004 |  |  | Y-6000 |  |  | F100 |
| N005 | G01 | X2000 |  |  |  |  |
| N006 | G02 | X 728 | Y2864 | I 6000 | J 0 |  |
| N007 |  | X7272 | Y3136 | I7272 | J6864 |  |
| N008 | G02 | X3620 | Y-10000 | I-12000 | J-10000 | F100 |

NUMERICAL CONTROL SYSTEM HAVING A SYMMETRICAL PATH GENERATION MEANS

BACKGROUND OF THE INVENTION

This invention relates to a system for generating symmetrical paths in a numerical control device, which device controls the table of a machine tool or the like, in such a manner that machining along the symmetrical paths can be carried out continuously in one machining direction.

A typical conventional numerical control device comprises, as illustrated in FIG. 1, a tape reader 2 forwardly reading instruction information from a paper tape 1, a circuit 3 decoding the instruction information and producing interpolating information, an interpolating circuit 5 producing pulse series, a driving circuit 6 driving the table of a machine tool or the like, and a symmetrical path control circuit 7 reversing the moving direction in each axis of coordinates. Accordingly, when a symmetrical path is generated, the only necessary modification is to reverse the moving direction of each axis, since the direction of the revolution of a cutter does not change. Thus, for instance, when a symmetrical path, as shown in FIG. 3, is generated from a paper tape which instructs the first quadrant path, as shown in FIG. 2, it is only possible to provide said symmetrical path by switching the moving direction of a cutter, namely, from a clockwise direction (first and third quadrants) to a counterclockwise direction (second and fourth quadrants) and vice versa.

However, in a numerical control device controlling a milling machine, if the machining direction along a symmetrical path is switched, the position of a cutter relative to the moving direction of a cutter is switched from one side to the other. Since a milling machine cutter having a regular structure cuts the work by the forward rotation of the main shaft, the aforesaid switching of the machining direction causes a switching between the upper cut and the down cut, which results in a change of cutting conditions and leads to roughening of the cut surface. In addition, when a closed path is generated by a combination of the conventional symmetrical paths, in order to follow through the closed path, as the operation of a cutter moves from one quadrant to another quadrant, the machine operation must be shifted from the end point of the one quadrant path to a separate starting point of the symmetrical path in the other quadrant.

SUMMARY OF THE INVENTION

Therefore, the object of the present invention is to mitigate the aforesaid difficulties of the conventional techniques, by providing a novel system, in which, if the original path provided by the original program on a paper tape is clockwise, the machining direction of symmetrical paths generated is also clockwise in every quadrant, and if the original path is counterclockwise, the machining direction of the generated symmetrical paths is also counterclockwise. The system according to the present invention comprises (1) an input medium for numerical control, said input medium carrying positional information convertible into increments in a device, and instruction information, said instruction information including sets of instruction blocks, each set of instruction blocks being adapted to continue the function of one instruction (e.g., instruction A) until another instruction (e.g., instruction B) interrupts the function of said one instruction (e.g., said instruction A), said instruction information being so edited as to apply one instruction (e.g., said instruction A) to the first block and the last block of that set of instruction blocks, which set is to continue the function of said one instruction (e.g., said instruction A); (2) an input means reading the input medium both in the forward and reverse directions; (3) a circuit producing forward-interpolating-information from the input medium information for forwardly moving along a path as defined by each instruction block; (4) a circuit producing reverse-interpolating-information from the input medium information for reversely moving along a path as defined by each instruction block; (5) an interpolating circuit producing pulse series from the interpolating information; (6) a circuit driving various shafts of a machine tool in response to the pulse series; (7) a symmetrical path control circuit which controls whether the input means reads the input medium forwardly or reversely, which one of the forward-interpolating-information producing circuit and the reverse-interpolating-information producing circuit should operate, and whether the interpolating circuit reverses the moving direction in each axis or not and (8) an input circuit providing quadrants in which the symmetrical path is generated.

BRIEF DESCRIPTION OF THE DRAWINGS

The invention will now be described in detail by referring to the accompanying drawings, wherein.

DETAILED DESCRIPTION OF THE PREFERRED EMBODIMENTS

Figure 4:
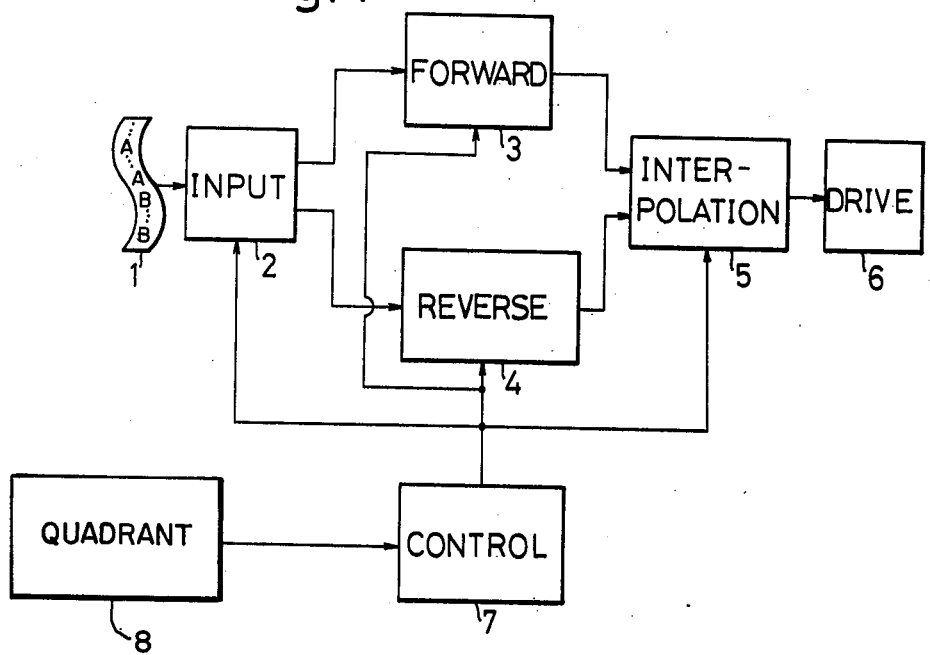
FIG. 4 is a block diagram of a numerical control device, based on a system according to the present invention.
Figure 5:
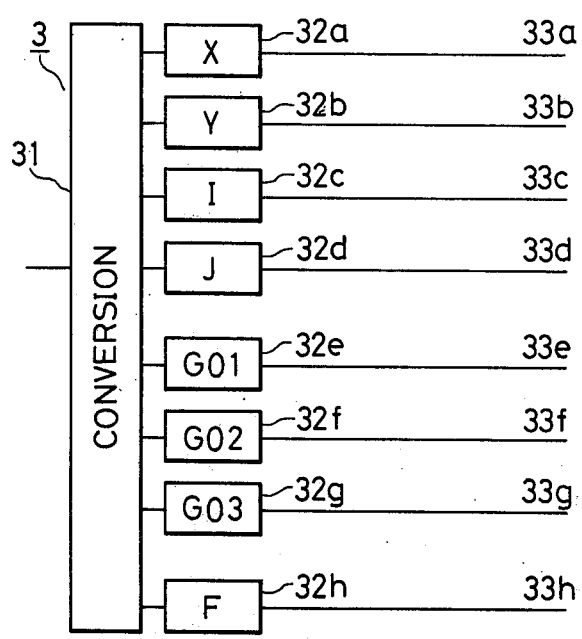
FIG. 5 is a detailed block diagram of a forward-interpolating-information producing circuit 3 in FIG. 4.

FIG. 4 illustrates an embodiment of the present invention. The reference numeral 1 is an input medium, e.g., paper tape, for providing input information to a numerical control device. The input information includes positional information in the form of increment, and instruction information having sets of instruction blocks, each set of instruction blocks being adapted to continue the function of one instruction (e.g., instruction A) until another instruction (e.g., instruction B) interrupts the function of said one instruction (e.g., said instruction A). The instruction information is so edited as to apply one instruction (e.g., said instruction A) to the first block and to the last block of that set of instruction blocks, which set continues the function of said one instruction (e.g., said instruction A). A different instruction (e.g., said instruction B) must follow the aforesaid last block of the aforesaid set of instruction blocks. Each instruction comprises a plurality of modals X, Y, I, J, G01, G02, G03 and/or F. Reference numeral 2 indicates an input means whose function is to read the input medium in both forward and reverse directions. One example of said input means 2 is a paper tape reader. Numeral 3 corresponds to a forward-interpolating-information producing circuit (shown in detail in FIG. 5), which produces, from the paper tape information, interpolation-information forwardly following the path, as defined by the instructions of each block. Said circuit 3 comprises a conversion circuit 31 for converting an input coded signal to a numerical signal, and registers 32a through 32h. Registers 32a and 32b hold the length of increment in X and Y directions, respectively. Registers 32c and 32d hold the information I and J concerning the coordinates of the center of the circle when the cutting outline is an arc. Registers 32e, 32f and 32j hold the modal of a linear cutting (G01), a clockwise arc cutting (G02), and a counterclockwise arc cutting (G03), respectively. The register 32h holds the modal F with regard to the moving speed of a cutter. The outputs of the registers 32a through 32h are applied to the interpolating circuit 5 through the lines 33a through 33h.

Figure 6:
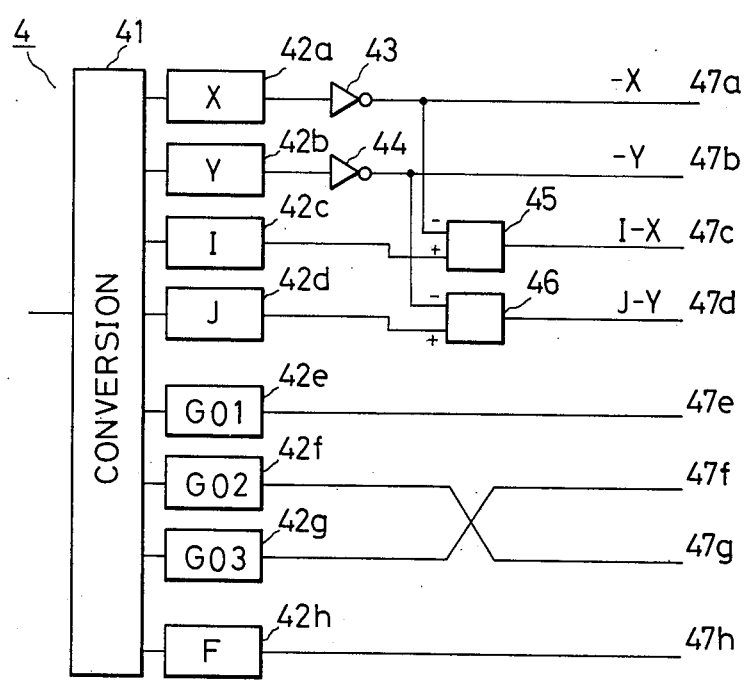
FIG. 6 is a detailed block diagram of a reverse-interpolating-information producing circuit 4 in FIG. 4.

The numeral 4 is a reverse-interpolation-information producing circuit (shown in detail in FIG. 6), which produces, from the paper tape information, interpolating-information reversely following the path, as defined by the instructions of each block. The circuit 4 comprises a conversion circuit 41 and registers 42a through 42h, the function of which is the same as registers 31 and 32a through 32h in FIG. 5. Said circuit 4 further comprises inverters 43 and 44, and subtractors 45 and 46. When reverse interpolation is performed, the lengths X and Y are changed to −X and −Y, the coordinates I and J are changed to I−X, and J−Y, modal G02 is changed to G03, and modal G03 is changed to G02. Modals G01 and F are unchanged. The interpolating circuit 5 is provided with the outputs of said circuit 4 through lines 47a through 47h.

Numeral 5 indicates an interpolating circuit, which operates so as to produce pulse series. Numeral 6 corresponds to a driving circuit, which drives various shafts of a machine tool. Numeral 7 refers to a control circuit, which controls whether the tape reader 2 reads forwardly or reversely, which one of the forward-interpolating-information producing circuit 3 and the reverse-interpolating-information producing circuit 4 should operate, and whether the interpolating circuit 5 reverses the moving direction in each axis of coordinates or not. Numeral 8 refers to an input circuit, e.g., switches, providing quadrants in which a symmetrical path is generated. In the illustrated embodiment, it is assumed that movements in both the X-axis and the Y-axis of orthogonal coordinates are controlled.

In operation, when the path as defined by the paper tape instruction information is generated, and an input circuit 8 designates particular quadrant (first quadrant) the symmetrical path control circuit 7 operates so as to cause the tape reader 2 to read the paper tape 1 forwardly, to actuate the forward-interpolating-information producing circuit 3, and to operate the interpolating circuit 5 without reversing the moving direction in any axis. When a path axially symmetrical with the path defined by the paper tape instruction information relative to a line parallel to the X-axis is generated and the input circuit 8 designates the quadrant (fourth quadrant), the symmetrical path control circuit 7 operates so as to cause the tape reader 2 to reversely read the paper tape 1, to actuate the reverse-interpolating-information producing circuit 4, and to operate the interpolating circuit 5 while reversing the moving direction only in the Y-axis. When a path axially symmetrical with the path defined by the paper tape instruction information relative to a line parallel to the Y-axis is generated (second quadrant), the symmetrical path control circuit 7 operates so as to cause the tape reader 2 to reversely read the paper tape 1, to actuate the reverse-interpolating-information producing circuit 4, and to operate the interpolating circuit 5 while reversing the moving direction only in the X-axis. When a path of point symmetry with respect to the path defined by the paper tape instruction information is generated and the input circuit 8 designates the quadrant (third quadrant), the symmetrical path control circuit 7 operates so as to cause the tape reader to forwardly read the paper tape 1, to actuate the forward-interpolating-information producing circuit 3, and to operate the interpolating circuit 5 while reversing the moving direction in both the X-axis and the Y-axis.

The above operation of the control circuit 7 is summarized in the following table.

| Quadrant | Direction of tape 1 | Interpolating circuit 3 or 4 | Interpolation circuit 5 |
|---|---|---|---|
| I | Forward | 3 (Forward) | $X \Rightarrow Y$ $Y \Rightarrow Y$ |
| II | Reverse | 4 (Reverse) | $X \Rightarrow -X$ $Y \Rightarrow Y$ |
| III | Forward | 3 (Forward) | $X \Rightarrow -X$ $Y \Rightarrow -Y$ |
| IV | Reverse | 4 (Reverse) | $X \Rightarrow X$ $Y \Rightarrow -Y$ |

Figures 7, 8:
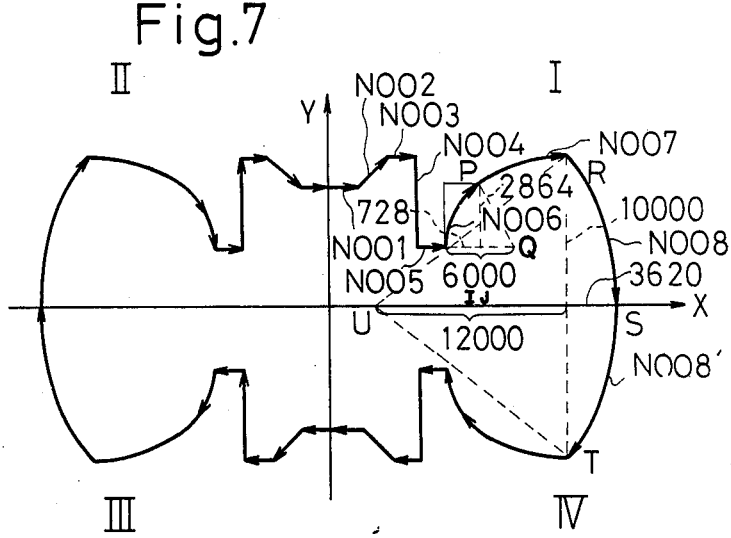
FIG. 7 shows a path symmetrical with that of FIG. 2, as generated by a system according to the present invention.
FIG. 8 shows instruction information on a paper tape, which information is applied to the input of a numerical control device for producing the path of FIG. 2.

The operation will now be described in further detail by referring to FIGS. 2, 5, 6, 7 and 8. FIG. 7 illustrates a symmetrical path, which is generated by the system according to the present invention based on the path of FIG. 2, and FIG. 8 lists the instruction information for said path of FIG. 2, which instruction information is stored on the paper tape 1. As regards the positional information of FIG. 8, the instruction blocks for rectilinear interpolation indicate the positional information in terms of increments from starting points to terminating points, while the instruction blocks for arcuate interpolation indicate the positional information in terms of increments from starting points to terminating points and increments from starting points to centers. As regards the reverse-interpolating-information, the rectilinear interpolation requires increments from forward terminating points to forward starting points, while the arcuate interpolation requires increments from forward terminating points to forward starting points and increments from forward terminating points to centers, and such increments can be easily calculated from the paper tape instruction information. The instruction G01 indicating the rectilinear interpolation corresponds to the aforesaid one instruction (e.g., the instruction A), and the instruction GO2 indicating the arcuate interpolation corresponds to the aforesaid other instruction (e.g., the instruction B) of the foregoing description. Thus, the instruction GO1 is included in both the instruction blocks N001 and N005, and the instruction GO2 is included in both the instruction blocks N006 and N008. The instruction F represents the feeding speed, and since different feeding speeds can be assigned to different functional instructions, e.g., the instructions A and B, the feeding speed instruction F300 is assigned to both the instruction blocks N001 and N003, while the feeding speed instruction F100 is assigned to both the instruction blocks N004 and N008.

Figure 1:
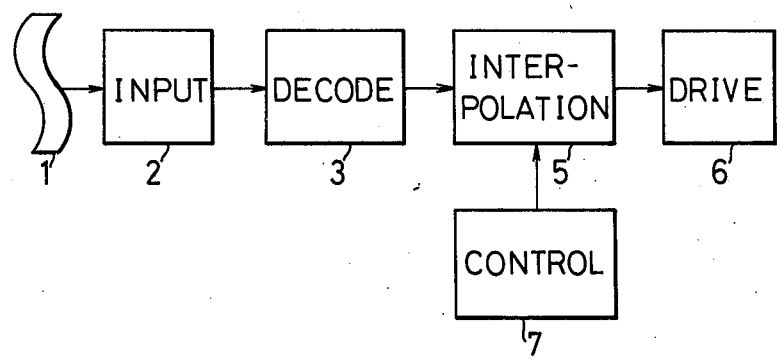
FIG. 1 is a block diagram of a numerical control device of a conventional system.
Figure 2:
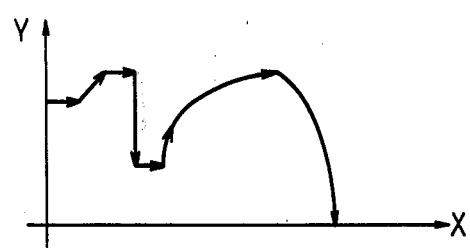
FIG. 2 shows an original programmed path from which symmetrical paths are generated.
Figure 3:
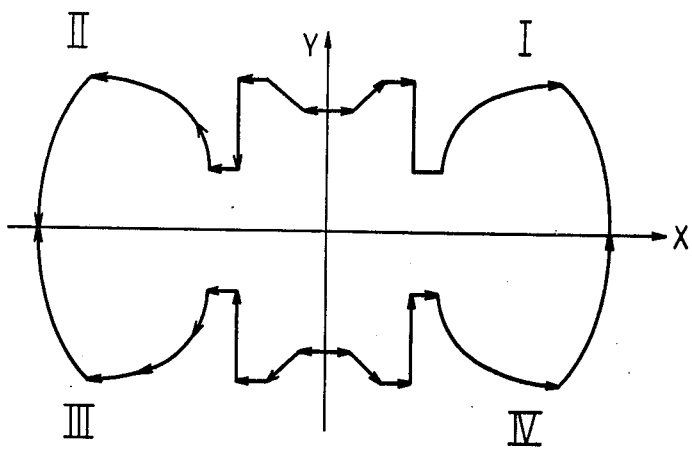
FIG. 3 shows a path symmetrical with that of FIG. 2, as generated by a conventional system.

In order to generate the path, as shown in FIG. 2 and in the first quadrant of FIG. 7, it is sufficient to forwardly read the paper tape 1 and to generate a path by forwardly executing the instruction blocks in succession. In order to generate the symmetrical path, as defined in the fourth quadrant of FIG. 7 in axial symmetry with the path of FIG. 2, it is necessary to reversely read the paper tape 1 and to generate a path by executing the instruction blocks in reverse order while reversing the moving direction in the Y-axis. In order to generate the symmetrical path, as defined in the third quadrant of FIG. 7 in point symmetry with the path of FIG. 2, it is necessary to forwardly read the paper tape 1 and to generate a path by forwardly executing the instruction blocks while reversing the moving direction in both X-axis and Y-axis. In order to generate the symmetrical path, as defined in the second quadrant of FIG. 7 in axial symmetry with the path of FIG. 2, it is necessary to reversely read the paper tape and to generate a path by executing the instruction blocks in reverse order while reversing the moving direction in the X-axis.

As an effect of the aforesaid system according to the present invention, if the original path is clockwise, the clockwise machining direction can be retained in generating its symmetrical paths, and if the original path is counterclockwise, the counterclockwise machining direction can be retained in generating its symmetrical paths. If the symmetrical path constitutes a closed path, as shown in FIG. 7, since the original path is clockwise in the first quadrant, the symmetrical closed path can be generated in a continuous fashion in the order of the first quadrant, the fourth quadrant, the third quadrant, and the second quadrant. It is apparent that a closed symmetrical path can be generated in a continuous fashion by properly selecting the sequence of generating constituent symmetrical partial paths thereof, regardless of which quadrant carries the original path and whether the machining direction of the original path is clockwise or counterclockwise.

The operation will be explained in more detail below.

In FIG. 8, the first instruction N001 having two modals GO1, X2000 and F300, indicates that a piece of work should be cut in X direction linearly (GO1) by the length of 2000 units at a cutting speed of 300 units, and so the instruction N001 in FIG. 8 corresponds to the cutting outline N001 in FIG. 7. The second instruction N002 having two modals X2000 and Y2000, indicates that the piece of work should be cut linearly (GO1) by the increment coordinates ($x=2000$, $Y=2000$) at a cutting speed $F=300$, and corresponds to the cutting outline N002 in FIG. 7. The third instruction N003 having the modals X2000, and F300 corresponds to the outline N003 in FIG. 7. The fourth instruction N004 having the modals Y-6000 and F100, indicates that the piece of work should be cut in the negative Y direction by a length of 6000 units at a cutting speed $F=100$, and corresponds to the cutting outline N004 in FIG. 7. The fifth instruction N005 having the modals GO1 and X2000 corresponds to the cutting outline N005 in FIG. 7. The sixth instruction N006 having the modals GO2, X728, Y2864, I6000 and J0, indicates that a piece of work should be cut in an arc, clockwise, and coordinates of the end point P of the arc are $X=728$, $Y=2864$, and the coordinates of the center Q of the arc are $I=6000$, $J=0$, and so the instruction N006 corresponds to the cutting outline N006 in FIG. 7. Similarly, the instructions N007 and N008 correspond to the cutting outlines N007 and N008 in FIG. 7, respectively.

After the cutting operation in the first quadrant is completed, the cutting operation is continued in the fourth quadrant as shown in FIG. 7. In said fourth quadrant, the control circuit 7 in FIG. 4 causes the paper tape reader 2 to reversely read the paper tape 1, the reverse-interpolating-information producing circuit 4 to operate, and the interpolating circuit 5 to change Y to −Y. Therefore, the final instruction N008 in FIG. 8 appears first at the output of the paper tape reader 2. The instruction N008 is applied to the reverse-interpolating-information producing circuit 4 shown in FIG. 6 and is changed to

| N008' | GO3 | X-3620 | Y10000 | I-15620 | J0 | F100 |

The modal Y10000 in N008' is further changed to $Y-10000$ by the interpolating circuit 5. The modal GO2 in FIG. 8 is changed to GO3 in the fourth quadrant since the moving direction of a cutter on a cutting path in the fourth quadrant is reversed from that in the first quadrant.

In the instruction N008', the coordinates of the end point T of the arc from the view of the starting point S are $X=-3620$, $Y=-10000$, and the coordinates of the center U of the arc from the view of the point S are $I'=I-X=-12000-3620=-15620$, and $J'=J-Y=-10000+10000=0$. Therefore, the instruction N008' corresponds to the cutting outline N008' in FIG. 7.

The operation mentioned above is continued so as to produce the cutting outline in the fourth, third and second quadrants in FIG. 7, respectively.

Although the positional information in the paper tape instruction information of the aforesaid embodiment is expressed in terms of increments, it is also possible to express the positional information in terms of other quantities which can be converted into increments in a numerical control device. If other instructions which have similar relations to those between the aforesaid instructions A and B, such as the so-called T function for tool exchange instructions and the so-called M function for miscellaneous instructions, are used, those other instructions must be edited in the aforesaid manner in accordance with the present invention.

As apparent from the foregoing disclosure, with the system according to the present invention, the machining direction of the original path can be retained in generating symmetrical paths, so that identical cutting conditions, e.g., upward cutting or downward cutting, can be maintained throughout the original path and the symmetrical paths. Furthermore, in the case of generating a closed path, continuous movement can be used.

What is claimed is:

1. A system generating symmetrical paths for numerical control, characterized in that the system comprises (1) an input medium for numerical control, said input medium carrying positional information convertible into increments in a device, and instruction information, said instruction information including sets of instruction blocks, each set of instruction blocks being adapted to continue the function of one instruction until another instruction interrupts the function of said one instruction, said instruction information being so edited as to apply one instruction to the first block and the last block of that set of instruction blocks, which set is to continue the function of said one instruction; (2) an input means reading the input medium both in the forward and reverse directions; (3) a circuit producing forward-interpolating-information from the input medium information for forwardly moving along a path as defined by each instruction block; (4) a circuit producing reverse-interpolating-information from the input medium information for reversely moving along a path as defined by each instruction block; (5) an interpolating circuit producing pulse series from the interpolating information; (6) a circuit driving various shafts of a machine tool in response to the pulse series; and (7) a symmetrical path control circuit which controls whether the input means reads the input medium forwardly or reversely, which one of the forward-interpolating-information producing circuit and the reverse-interpolating-information producing circuit should operate, and whether the interpolating circuit reverses the moving direction in each axis or not; whereby, in case of generating the path as defined by the input medium information, the input medium is read forwardly, forward-interpolating-information is produced, and the pulse series are produced without changing the moving direction in any axis; in case of generating a path which is axially symmetrical with the path as defined by the input medium information relative to a line parallel to one axis of coordinates, the input medium is reversely read, reverse-interpolating-information is produced, and the pulse series are produced while reversing the moving direction in the other axis of the coordinates; and in case of generating a path which is symmetrical with the path as defined by the input medium information relative to a point, the input medium is forwardly read, forward-interpolating-information is produced, and pulse series are produced while reversing the moving direction in each axis of the coordinates.

2. The invention as defined in claim 1, wherein said circuit producing forward-interpolating-information comprises a conversion circuit for converting the input coded signal to the numerical signal and a plurality of registers connected to the output of said conversion circuit, each register being related to each modal in an instruction.

3. The invention as defined in claim 1, wherein said circuit producing reverse-interpolating-information comprises a conversion circuit for converting the input coded signal to the numerical signal, means for calculating increments from the forward terminating point to the forward starting point, means for calculating increments from the forward terminating point to the center, and means for exchanging modals clockwise and counterclockwise, respectively.

* * * * *